(No Model.) 5 Sheets—Sheet 1.
D. F. GRAHAM & W. P. ALLEN.
CONTACTING DEVICE FOR ELECTRIC RAILWAYS.
No. 519,328. Patented May 8, 1894.
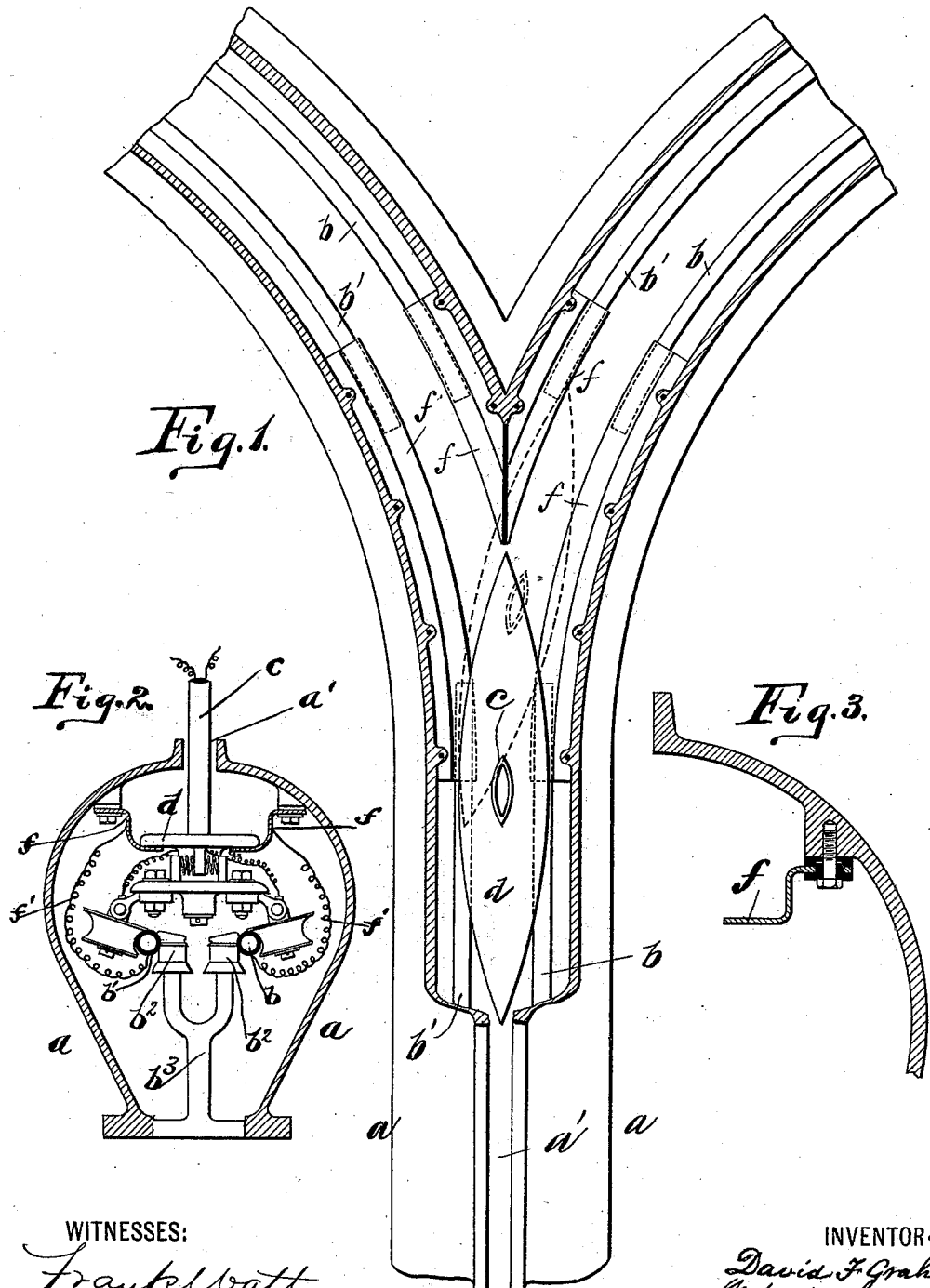

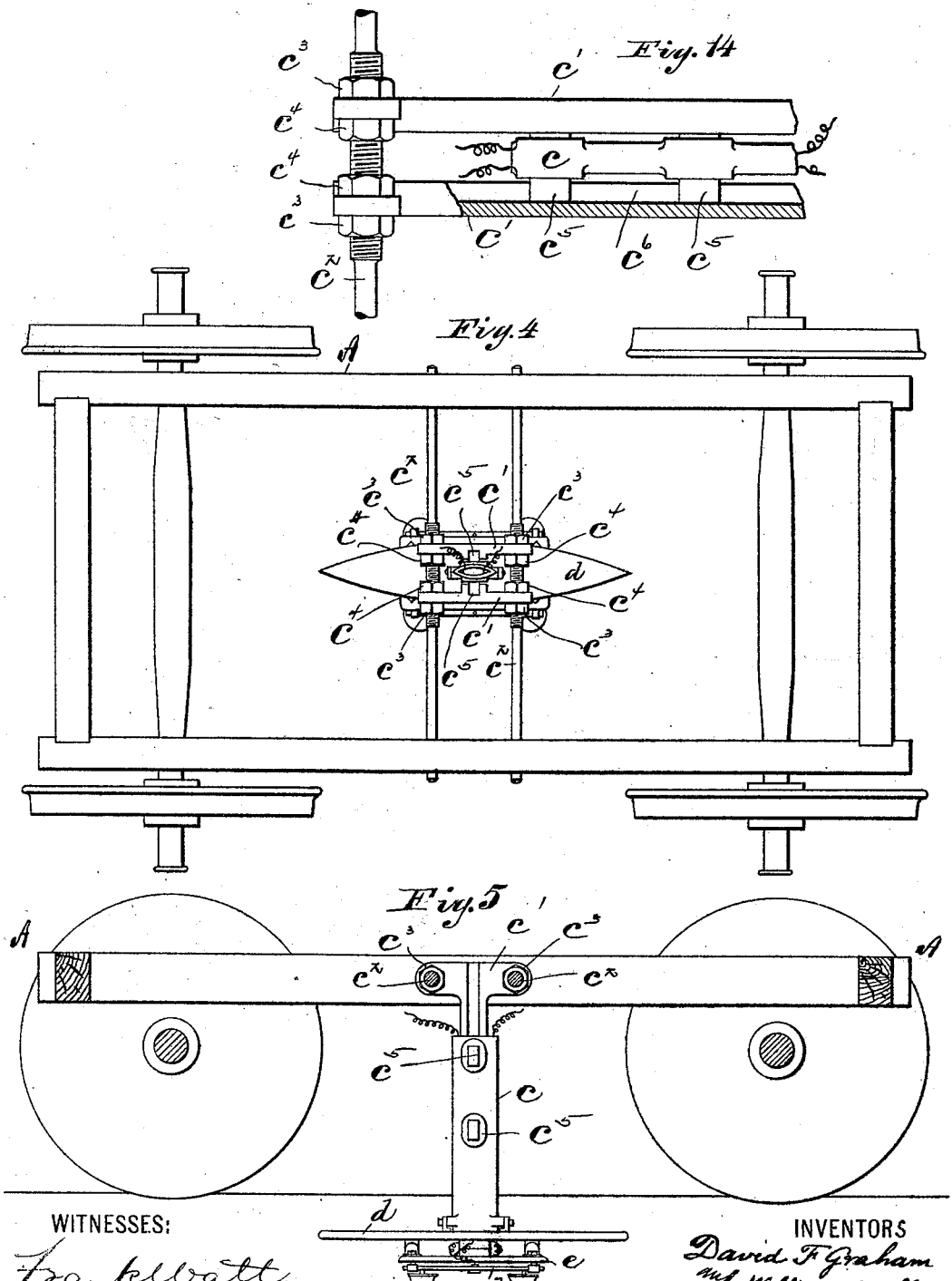

(No Model.) 5 Sheets—Sheet 3.
D. F. GRAHAM & W. P. ALLEN.
CONTACTING DEVICE FOR ELECTRIC RAILWAYS.
No. 519,328. Patented May 8, 1894.
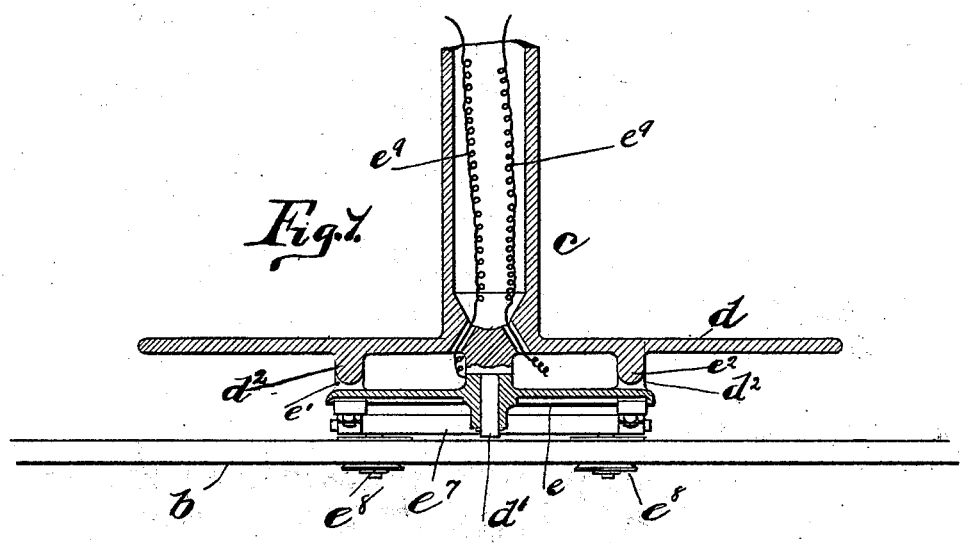
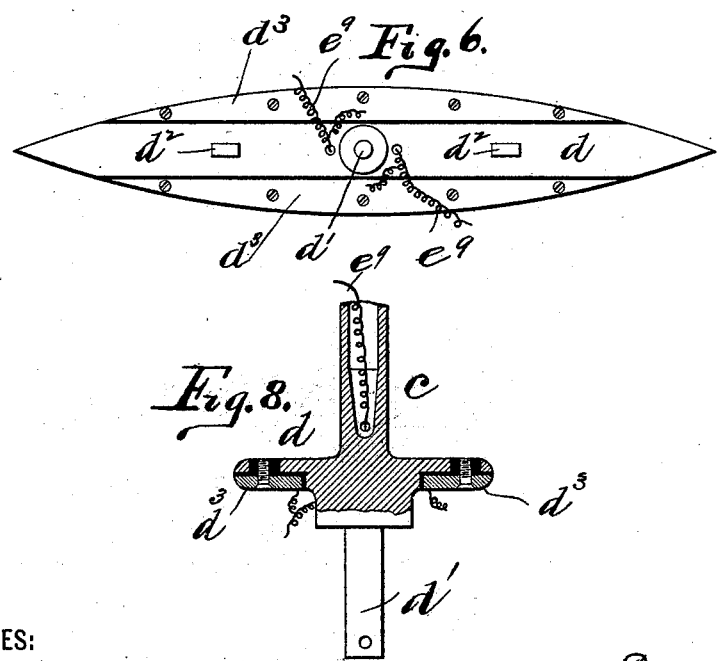
WITNESSES:
INVENTORS
David F. Graham
and William P. Allen
BY
ATTORNEYS
THE NATIONAL LITHOGRAPHING COMPANY,
WASHINGTON, D. C.

(No Model.) 5 Sheets—Sheet 4.
D. F. GRAHAM & W. P. ALLEN.
CONTACTING DEVICE FOR ELECTRIC RAILWAYS.
No. 519,328. Patented May 8, 1894.
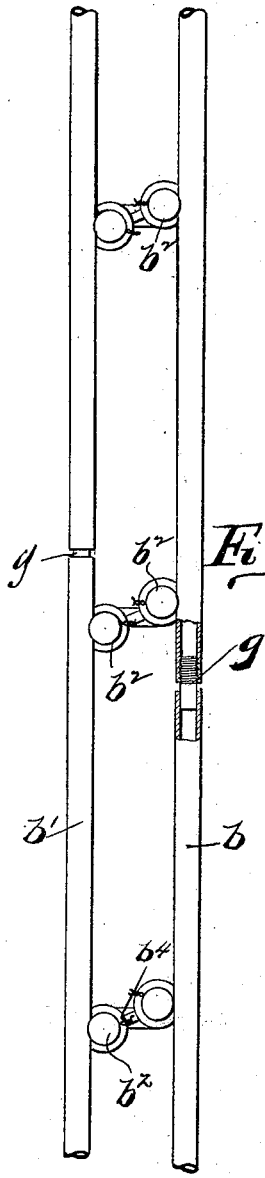
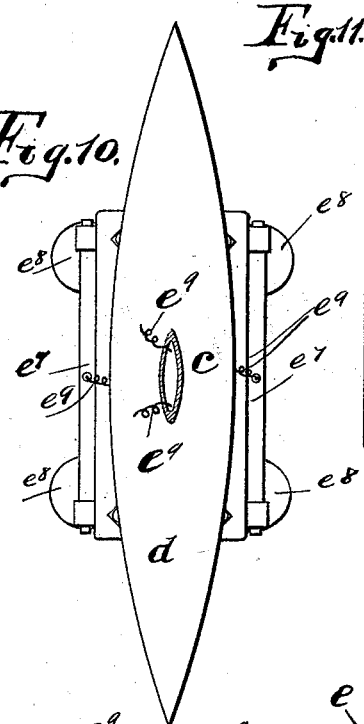
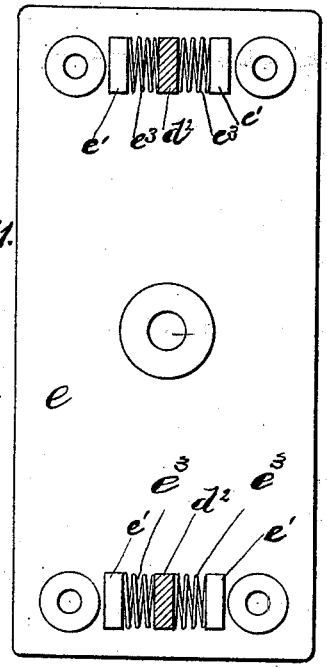
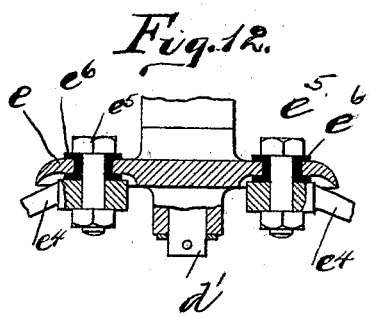
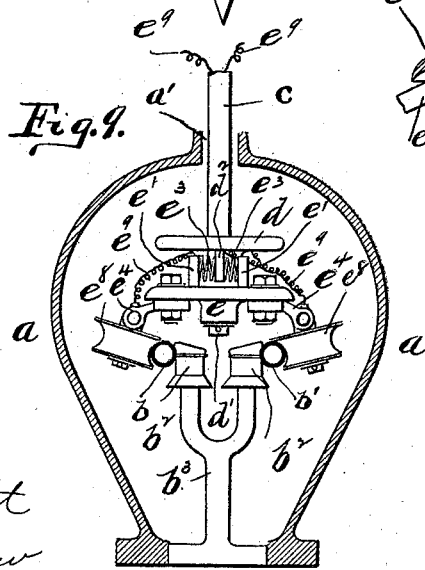
WITNESSES:
INVENTORS
David F. Graham
and William P. Allen
BY
ATTORNEYS (No Model.) 5 Sheets—Sheet 5.
D. F. GRAHAM & W. P. ALLEN.
CONTACTING DEVICE FOR ELECTRIC RAILWAYS.
No. 519,328. Patented May 8, 1894.
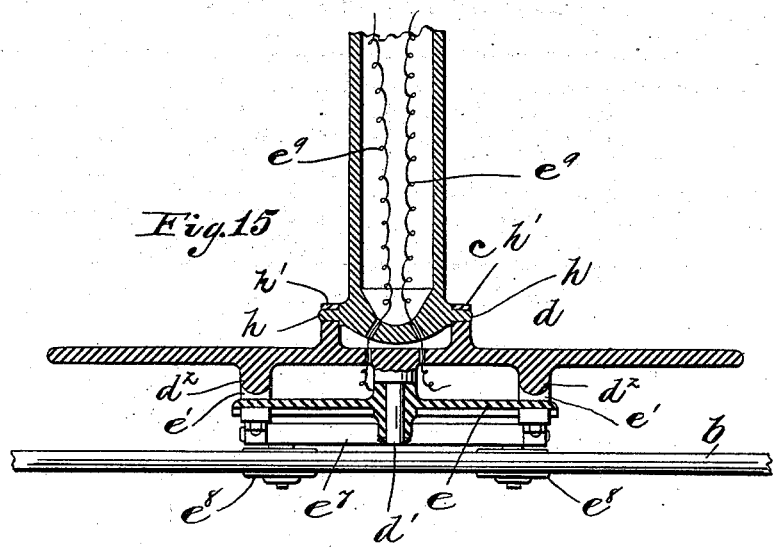
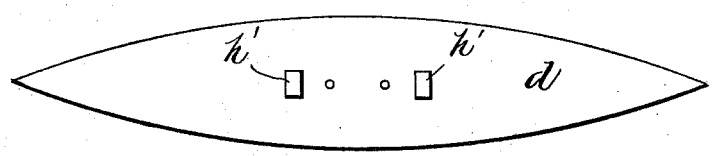
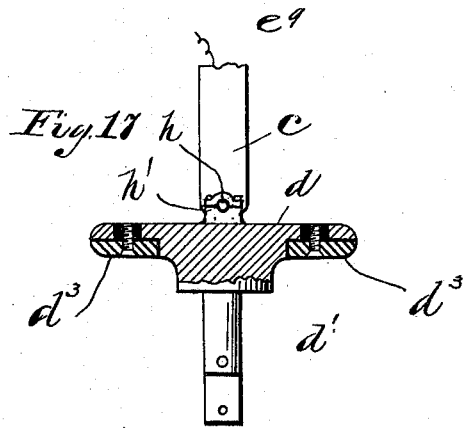
WITNESSES:
H. B. Bradshaw
Chas. I. Welch
INVENTORS
David F. Graham
William P. Allen
BY
Attorneys

UNITED STATES PATENT OFFICE.

DAVID F. GRAHAM, OF SPRINGFIELD, OHIO, AND WILLIAM P. ALLEN, OF CHICAGO, ILLINOIS, ASSIGNORS OF ONE-THIRD TO OLIVER S. KELLY, OF SPRINGFIELD, ILLINOIS.

CONTACTING DEVICE FOR ELECTRIC RAILWAYS.

SPECIFICATION forming part of Letters Patent No. 519,328, dated May 8, 1894.

Application filed October 25, 1893. Serial No. 489,140. (No model.)

*To all whom it may concern:*

Be it known that we, DAVID F. GRAHAM, residing at Springfield, in the county of Clark and State of Ohio, and WILLIAM P. ALLEN, residing at Chicago, in the county of Cook and State of Illinois, citizens of the United States, have invented certain new and useful Improvements in Contacting Devices for Electric Railways, of which the following is a specification.

Our invention relates to improvements in devices for establishing an electrical connection between a moving car and a stationary source of supply.

It especially relates to devices for effecting an electrical contact between a moving car or vehicle and conductors placed under ground or inclosed within a suitable conduit.

One of the objects of our invention is to provide a simple contacting device which may be readily removed or replaced.

A further object of our invention is to provide a contacting device which shall be readily adjustable to the work to be performed.

A further object of our invention is to provide means for establishing a continuous electrical contact in changing direction or in passing from one track to another, as in the case of switches and similar constructions.

We attain these objects by the constructions illustrated in the accompanying drawings, in which—

Figure 1 is a plan view, showing our electric contacting devices applied to a conduit; some portions of said conduit being broken away and sectioned to more clearly illustrate the construction and operation of the contacting devices. Fig. 2 is a transverse sectional view of the conduit, showing an end elevation of the contacting devices. Fig. 3 is an enlarged detail view of a portion of the same. Fig. 4 is a bottom plan of a vehicle to which our contacting device is attached. Fig. 5 is a side elevation of the same showing a modification. Fig. 6 is a plan view of a portion of our improved contacting device in detail. Figs. 7 and 8 are respectively a longitudinal and transverse sectional view of the same. Figs. 9 to 14, inclusive, are details of the same, hereinafter referred to. Figs. 15 to 17, inclusive, are details showing modified forms of some of the parts.

Like parts are represented by similar letters of reference in the several views.

In the said drawings $a$, $a$, represents a conduit, which may be of any suitable shape and size and formed of any suitable material. This conduit is provided at the top with a slotted opening $a'$, and contains two longitudinal conductors $b$, $b'$, supported upon suitable insulating devices $b^2$, on a bifurcated standard $b^3$, projecting upwardly from the bottom of said conduit. These conductors $b$, $b'$, preferably consist of copper tubes supported against the sides of the insulators $b^2$, $b^2$, to which they are secured by retaining wires $b^4$, which extend through openings in one side of the tubes and around the insulators, or in any other suitable manner.

Our contacting device is supported on a vertical standard $c$, connected to the car frame preferably through the intervention of depending pieces $c'$, $c'$, secured on parallel bars $c^2$, $c^2$, the opposite extremities of which are adapted to slide laterally in the car frame; the depending pieces being secured on said rods by nuts $c^3$, $c^4$, by which they may be adjusted or held in position, as desired. The standard $c$, has projecting lugs $c^5$, adapted to fit in grooves $c^6$, formed in the depending pieces $c'$, thus permitting a vertical as well as a lateral movement of the standard $c$. Secured to the lower end of the standard $c$, is a metallic contacting piece $d$, preferably formed with curved sides and pointed at each end and termed by us the shuttle. This shuttle $d$, may be formed integral with the standard if desired, though it is preferably hinged thereto by providing on one of the parts trunnions $h$, and on the other suitable bearings $h'$ to receive said trunnions, as shown in Figs. 5, 15, 16 and 17 to permit a slight lateral tilting which will enable it to adjust itself to the work to be performed, as will hereinafter more fully appear. Extending downwardly from the center of the shuttle is a stud $d'$, and in line with said stud and on opposite sides thereof are lugs $d^2$, $d^2$, which may also be formed integral with the shuttle $d$. Pivoted on the stud $d'$, is a vibrating frame $e$, which has at the top upwardly projecting ears $e'$, $e'$, which stand on each side of the respective lugs $d^2$, interposed springs $e^3$, being placed on opposite sides of the lugs $d^2$, and between the same and the lugs $e'$, so that the said lugs $d^2$, are held normally between the respective ears $e'$, $e'$, and the frame $e$, held normally in a central position with reference to the shuttle $d$; the said frame being at the same time capable of a yielding movement in either direction about said stud $d'$, for the purpose hereinafter specified. (See Fig. 11.)

To the under side of the frame are bolted or otherwise secured lugs or ears $e^4$, perforated at their lower ends and projecting laterally from said frame on each side at or near each end; these lugs being preferably bolted to said frame, as shown in Fig. 12 by bolts $e^5$, which pass through a block of hard rubber $e^6$, or other insulating material, which prevents any electrical contact between the said lugs or ears $e^4$, and the frame $e$. Extending laterally along each side of the frame $e$, and slightly below the same, are pivoted rods $e^7$, the ends of which are journaled in the perforations in the respective ears $e^4$. These rods $e^7$, carry near their extremities contacting rollers $e^8$, preferably curved on their peripheries and adapted, when in their normal positions, to contact with the conductors $b$, $b'$, within the conduit $a$, $a$, in which position the supporting frame $e$, and the shuttle $d$, with all their connected parts, are placed within the conduit; the standard only projecting therefrom through the slotted opening $a'$. An electrical connection is established from the rods or bars $e^7$, to the moving car, preferably by means of insulated wires $e^9$, which connect at one end to said rods or bars and pass upwardly therefrom through the standard $c$, which is made hollow for this purpose, to any desired point on the moving car. The grooved wheels $e^8$, being continuously in contact with the conductors $b$, establish an electric circuit through said wheels, the rods or bars $e^7$, and the wires $e^9$, to the motors or other electrical apparatus on the car; one of the said conductors being adapted to be connected to the positive and the other to the negative pole of a generator arranged at any convenient point, thus establishing a metallic connection from said generator to the electrical appliances on the moving car.

The shuttle $d$, is provided on each side with metallic contacting pieces $d^3$, which are insulated from the main body of the shuttle; each of said contacting pieces being electrically connected to the conducting wires $e^9$, which lead to the car. At the points where the track branches, we provide in the conduits contacting strips $f$, preferably secured to the top of the conduit but insulated therefrom. These strips are arranged on each side of the conduit and extend slightly on each side to the point where the same is branched to correspond with the branching of the track. At such points it is necessary that the main conductors be intercepted to permit the passing of the contacting devices from one set of tracks to the other, and these contacting strips $f$, are extended so as to overlap the respective ends of the intercepted conductors while lying in a plane considerably above said conductors. An electrical connection is formed from the respective conductors to the respective strips $f$, preferably by means of insulated wires $f'$, as shown in Fig. 2. The shuttle $d$, is normally held slightly above the plane of the contacting strips $f$, by its contact with the conductors. In passing over a switch, however, the shuttle $d$, is turned in the proper direction by the movement of the carrying wheels passing over the switch in the track rails, and enters that branch of the conduit which corresponds to the track over which the vehicle is to pass. As the contacting devices leave the end of the main conductors, the shuttle is brought into contact with the respective strips $f$, which establishes an electrical connection from said contacting strips $f$, to the plates $d^3$, on said shuttle, and thence to the vehicle; this connection being maintained until the trolley wheels $e^8$, again come in contact with the main conductors. It will thus be seen that a continuous electric contact is established between the stationary source of supply and the moving vehicle at all times in changing direction or in passing switches, so that the main conductors are intercepted for the purpose of permitting the contacting devices to pass in either direction.

The trolley wheels $e^8$, are so formed that the upper flange of the curved periphery is slightly larger than the lower, and the contacting between the said curved wheel and the conductors $b$, is so arranged with reference to the pivotal point of the supporting rods $e^7$, that any downward pressure on the contacting device causes the said trolley wheels to impinge more closely against said conductors; while at the same time by raising said contacting devices slightly, the trolley wheels may be turned on their pivoted supports so as to readily clear said conductors. The arrangement of the interposed springs between the supporting frame and the shuttle permits the trolley wheels to follow the conductors over any inequalities of construction and maintain at all times a close contact therewith, even though the alignment of said conductors should become impaired. In Fig. 13 we have shown the method of forming the conductors in sections, joined together by connecting plugs $g$, which permits the expansion and contraction of said conductors, but this construction forms no part of the present invention.

It will be seen from the above description that a contacting device is produced which is at once simple in construction and effective in operation, the parts being capable of ready adjustment to the work to be performed and adapted to produce a continuous electrical contact between the stationary source of supply and the moving vehicle under all conditions of use.

When the shuttle d is hinged to the standard, as shown in Figs. 5, 15, 16 and 17, the axis of the hinged connection is formed on a line with the direction of travel of said shuttle, so that a lateral tilting of the shuttle is permitted, while at the same time the said shuttle is guided in any direction which the car may travel by the standard, the shuttle in this respect always maintaining the same relative position with reference to the car, while the main auxiliary contacting device is free to assume different positions around the pivoted connection between said shuttle and contacting frame.

Having thus described our invention, we claim—

1. In an electrical contacting device, a supporting standard, main and auxiliary contacting devices connected to said standard, a main conductor and auxiliary conductors adapted to form an electrical connection with the respective contacting devices, said auxiliary contacting device being supported on said standard so as to move positively therewith when said standard is turned on its longitudinal axis, and said main contacting device being pivoted to said auxiliary device so as to move independently of said standard when said standard is moved on its longitudinal axis, substantially as specified.

2. In an electric railway, a conduit having branched connections, as described, an electrical conductor or conductors leading from opposite sides of said branched connections but intercepted at points to permit the passing of a contacting device from one branch to another, and a moving frame adapted to contact with said main conductors, said frame being provided with a pivoted shuttle, and auxiliary connecting plates arranged within said conduit and connected electrically to said conductors and adapted to establish an electrical connection with said shuttle at the point where the continuity of said main conductors is broken, substantially as specified.

3. In an electrical contacting device, a vertical standard, a shuttle connected thereto, and contacting plates secured to said shuttle but insulated therefrom, a pivoted frame below said shuttle, and hinged trolley wheels on said frame insulated therefrom, and electrical connections from said trolley wheels through said standard, and a branched connection from said trolley wheels to said auxiliary plates, main conductors adapted to contact with said trolley wheels, and auxiliary conductors adapted to contact with the opposite sides of said shuttle at points where the continuity of the main conductors is broken, substantially as specified.

4. The combination with the insulated electrical conductors, of a carrying frame supported on a central standard, contacting devices insulated from said carrying frame and adapted to contact with the respective conductors, and a shuttle also carried on said standard and having on opposite sides contacting devices insulated therefrom, and an electrical connection from said trolley wheels to the contacting devices on said shuttle, and auxiliary contacting plates adapted to contact with opposite sides of said shuttle at points where the continuity of said main conductors is broken, and a connection from said conductors to said auxiliary plates, substantially as specified.

5. The combination with the shuttle, the supporting standard, the frame pivoted to said shuttle and having the interposed springs which permit a yielding movement of said frame, and insulated bearings extending laterally from said frame, and the pivoted bars journaled in said bearings, and trolley wheels on said bars, and an electrical connection from said trolley wheels through said standard, substantially as specified.

6. The combination with the pivoted supporting frame having the yielding connection, as described, of the hinged bars on opposite sides of said frame, and the curved trolley wheels on said bars, electrical conductors adapted to contact with said bars, said conductors being arranged below and between the respective connections with said bars, whereby a downward pressure on said frame causes said wheels to impinge against said conductors, substantially as specified.

7. A contacting device for electrical railways, a branched conduit having intercepted electrical conductors, as described, a main contacting device adapted to establish a connection from said conductors to a moving vehicle, and auxiliary contacting devices arranged on each side of said conduit at the branched portions thereof, and a shuttle arranged above and pivotally connected to said main contacting device, said shuttle being adapted to form an electrical connection with said auxiliary contacting devices during the time that said main contacting device is out of circuit with said main conductor, substantially as specified.

8. The combination with the supporting standard, the shuttle thereon, a projecting stud on said shuttle, a frame journaled on said stud, engaging projections on said frame and shuttle respectively, and interposed springs between said projections, hinged bars on said frame, and trolley wheels on said bars, and main and auxiliary conductors adapted to successively contact with said trolley wheels and said shuttle, substantially as specified.

9. The combination with the conductors, of the hinged rods or bars carrying the grooved wheels, a hollow standard supporting said bars, and insulated conductors extending from said hinged bars through said standard, substantially as specified.

10. In an electrical contacting device, the combination with the main trolley wheels, of an auxiliary plate or shuttle and a supporting standard, said shuttle being hinged to said standard, substantially as specified.

11. The combination with the supporting standard, of a hinged shuttle on the bottom thereof, a pivoted frame on said shuttle, and contacting devices on the shuttle and frame respectively, substantially as and for the purpose specified.

12. In an electrical contacting device, a central standard, a hinged shuttle connected thereto, and a pivoted frame connected to said shuttle, contacting devices on said frame and shuttle respectively, and an electrical connection between the respective contacting devices, substantially as and for the purpose specified.

In testimony whereof we have hereunto set our hands this 14th day of October, A. D. 1893.

DAVID F. GRAHAM.
WILLIAM P. ALLEN.

Witnesses as to David F. Graham:
ROBERT C. RODGERS,
FRANK WATT.

Witnesses as to William P. Allen:
SAML. E. BARR,
HERBERT HAMMOND.

It is hereby certified that the residence of the assignee in Letters Patent No. 519,328, granted May 8, 1894, upon the application of David F. Graham, of Springfield, Ohio, and William P. Allen, of Chicago, Illinois, for an improvement in "Contacting Devices for Electric Railways," was erroneously written and printed "Springfield, Illinois," whereas said residence should have been written and printed *Springfield, Ohio;* and that the said Letters Patent should be read with this correction therein that the same may conform to the record of the case in the Patent Office.

Signed, countersigned, and sealed this 29th day of May, A. D. 1894.

[SEAL.]            JNO. M. REYNOLDS,
*Assistant Secretary of the Interior.*

Countersigned:
 JOHN S. SEYMOUR,
  *Commissioner of Patents.*